US010865048B2

(12) United States Patent
Grimm et al.

(10) Patent No.: US 10,865,048 B2
(45) Date of Patent: *Dec. 15, 2020

(54) CONVEYOR IDLER SEAL APPARATUS, SYSTEMS, AND METHODS

(71) Applicant: Superior Industries, Inc., Morris, MN (US)

(72) Inventors: Lafe Grimm, Hancock, MN (US); Paul Schmidgall, Morris, MN (US); Owen Greg Rude, Montevideo, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,311

(22) Filed: Feb. 24, 2020

(65) Prior Publication Data

US 2020/0189851 A1 Jun. 18, 2020

Related U.S. Application Data

(63) Continuation of application No. 16/339,131, filed as application No. PCT/US2017/054949 on Oct. 3, 2017, now Pat. No. 10,569,962.

(Continued)

(51) Int. Cl.
*B65G 39/09* (2006.01)
*F16C 33/78* (2006.01)
(Continued)

(52) U.S. Cl.
CPC ............ *B65G 39/09* (2013.01); *F16C 13/022* (2013.01); *F16C 33/7859* (2013.01); *F16C 33/7866* (2013.01); *F16C 33/7886* (2013.01); *F16C 33/7896* (2013.01); *F16C 33/80* (2013.01); *F16C 33/805* (2013.01); *F16C 2326/58* (2013.01)

(58) Field of Classification Search
CPC .. B65G 39/09; F16C 33/7859; F16C 33/7866; F16C 33/7886; F16C 33/7896; F16C 33/805; F16C 2326/58; F16C 33/80
See application file for complete search history.

(56) References Cited

U.S. PATENT DOCUMENTS 2,858,176 A    10/1958 Thompson
3,978,181 A *   8/1976 Vahle .................. B29C 33/0044
                                               264/46.7

(Continued)

FOREIGN PATENT DOCUMENTS

DE    102006024154 B3    7/2007
EP            15739       4/1983

OTHER PUBLICATIONS

"Anatomy of an Idler", website-video; https://www.youtube.com/watch?v=eidZE3dQ8FY, Nov. 1, 2013, 1 page.

(Continued)

*Primary Examiner* — Mark A Deuble
(74) *Attorney, Agent, or Firm* — Todd R. Fronek; Larkin Hoffman Daly & Lindgren Ltd.

(57) ABSTRACT

Seal assemblies for conveyor idler rolls are provided. In some embodiments, a plurality of subsets of seal components are selectively installable in the seal assembly. In some embodiments, one or more fins are included on a seal.

28 Claims, 14 Drawing Sheets

Related U.S. Application Data

(60) Provisional application No. 62/403,228, filed on Oct. 3, 2016.

(51) Int. Cl.
  *F16C 13/02* (2006.01)
  *F16C 33/80* (2006.01)

(56) References Cited

U.S. PATENT DOCUMENTS

| | | | |
|---|---|---|---|
| 4,277,114 A | 7/1981 | Lindegger | |
| 4,373,759 A | 2/1983 | Greener et al. | |
| 4,972,939 A | 11/1990 | Uttke et al. | |
| 5,028,054 A | 7/1991 | Peach | |
| 5,110,143 A | 5/1992 | Hibbetts | |
| 5,261,528 A | 11/1993 | Bouchal | |
| 5,372,230 A | 12/1994 | Niklewski | |
| 5,515,961 A | 5/1996 | Murphy et al. | |
| 5,655,642 A | 8/1997 | Lawrence et al. | |
| 5,664,644 A | 9/1997 | Reicks et al. | |
| 5,908,249 A | 6/1999 | Martinie et al. | |
| 6,206,182 B1* | 3/2001 | Wilson | F16C 33/76 198/842 |
| 6,234,293 B1 | 5/2001 | Fasoli | |
| 6,287,014 B1* | 9/2001 | Salla | B65G 39/09 193/37 |
| 6,349,819 B1 | 2/2002 | Nohl et al. | |
| 7,637,364 B1 | 12/2009 | Felton | |
| 8,146,733 B2* | 4/2012 | Fox | B65G 39/09 193/37 |
| 8,790,018 B2* | 7/2014 | Leuver | B65G 39/09 384/546 |
| 9,156,617 B2 | 10/2015 | Fehr et al. | |
| 10,215,282 B1* | 2/2019 | Taylor | F16J 15/4476 |
| 2008/0078648 A1* | 4/2008 | Orlowski | B65G 39/09 193/37 |
| 2008/0153683 A1* | 6/2008 | Kirkpatrick | B65G 39/09 492/16 |
| 2008/0190743 A1* | 8/2008 | Hong | B65G 39/09 198/835 |
| 2011/0168520 A1* | 7/2011 | Gagnon | B29C 65/56 193/37 |
| 2018/0156336 A1* | 6/2018 | Kato | F16J 15/3232 |

OTHER PUBLICATIONS

"Imperial Mounted Roller Bearings", Brochure, Baldor Electric Company, Apr. 2013, 8 pages.
"Industrial Sealing Solutions", Brochure, SKF Group, Jun. 2014, 12 pages.
"International Search Report and Written Opinion", Application No. PCT/US2017/054949, dated Dec. 15, 2017, 12 pages.
"Luff High Moisture Seal", website-video; https://www.aggman.com/luff-high-moisture-seal/, Jul. 2, 2012, 1 page.
"Luff High Moisture Seal", website-video; https://www.youtube.com/watch?v=MAwptl8bwaY, Jul. 22, 2010, 1 page.
"Engineering & Dimensions—Idlers", PPI, Catalog, 2012, 64 pages.
"Conveying Components Product Handbook", Brochure, Superior Industries, Jul. 2016, 52 pages.

* cited by examiner

CONVEYOR IDLER SEAL APPARATUS, SYSTEMS, AND METHODS

BACKGROUND

Conveyors such as belt conveyors are used to move material (e.g., aggregate material) in various industries. Seals are sometimes included in such conveyors, such as on idler rollers.

DESCRIPTION

Figure 1:
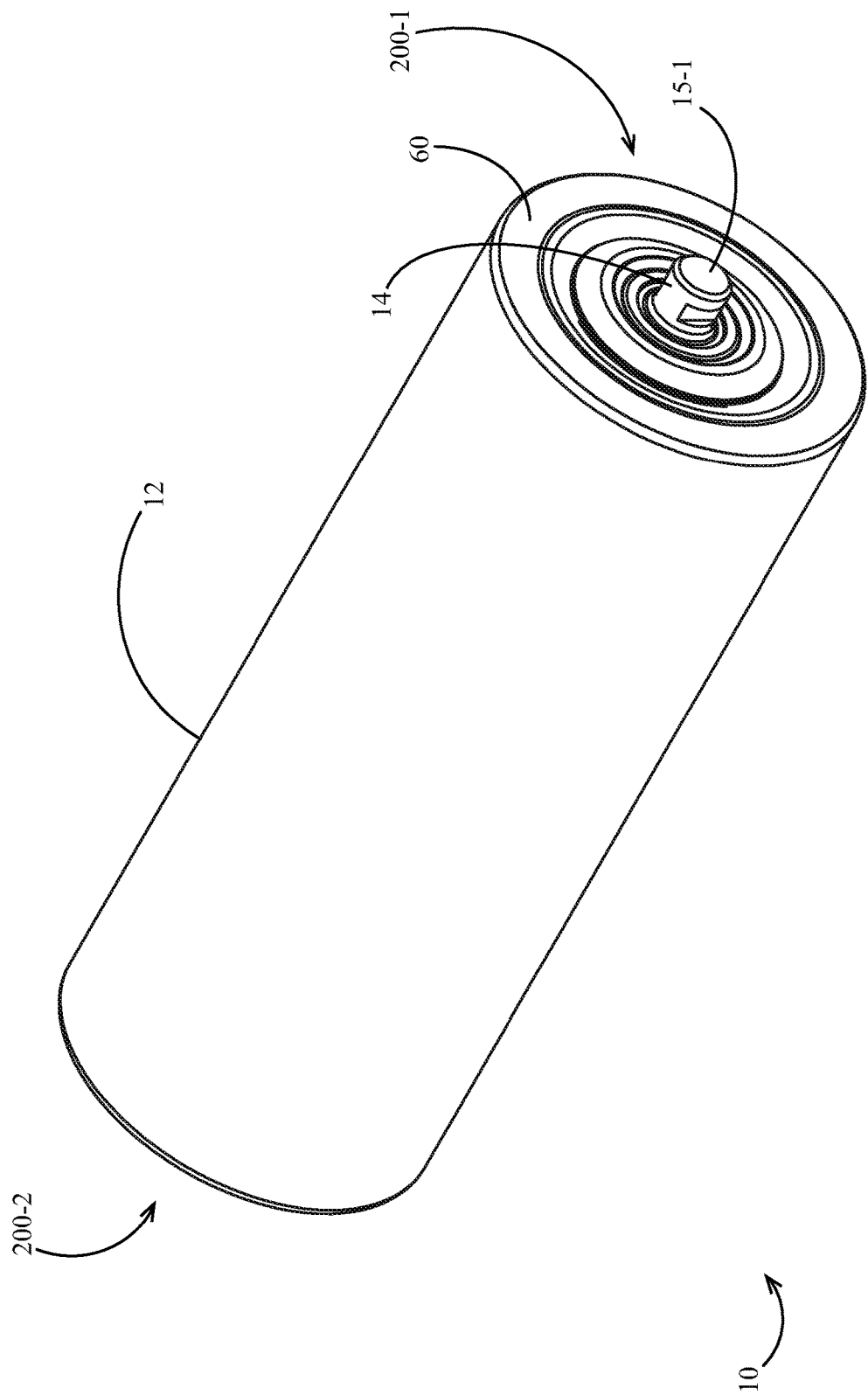
FIG. 1 is an isometric view of an embodiment of an idler roll.
Figure 2:
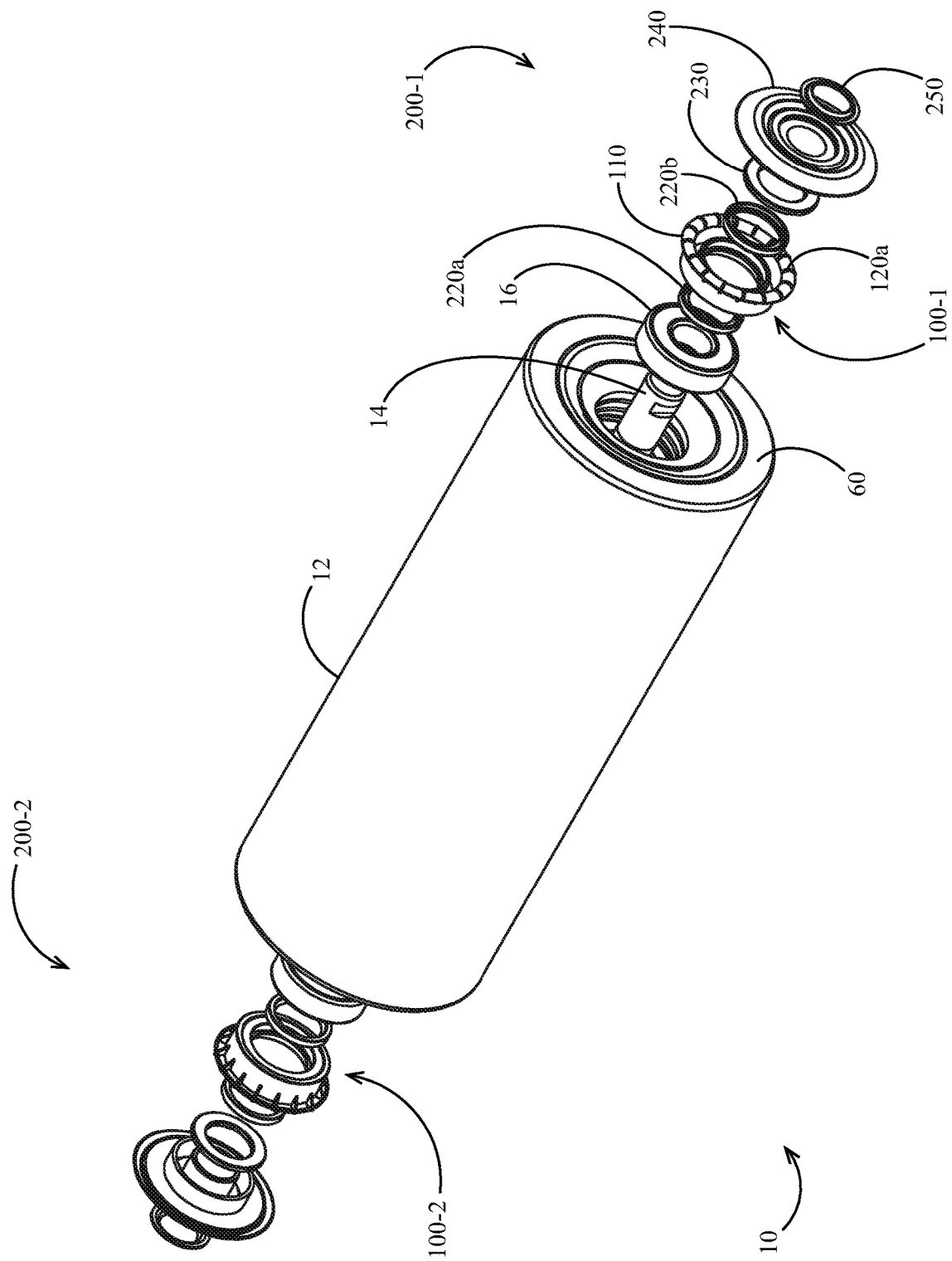
FIG. 2 is an exploded isometric view of the idler roll of FIG. 1.
Figure 3:
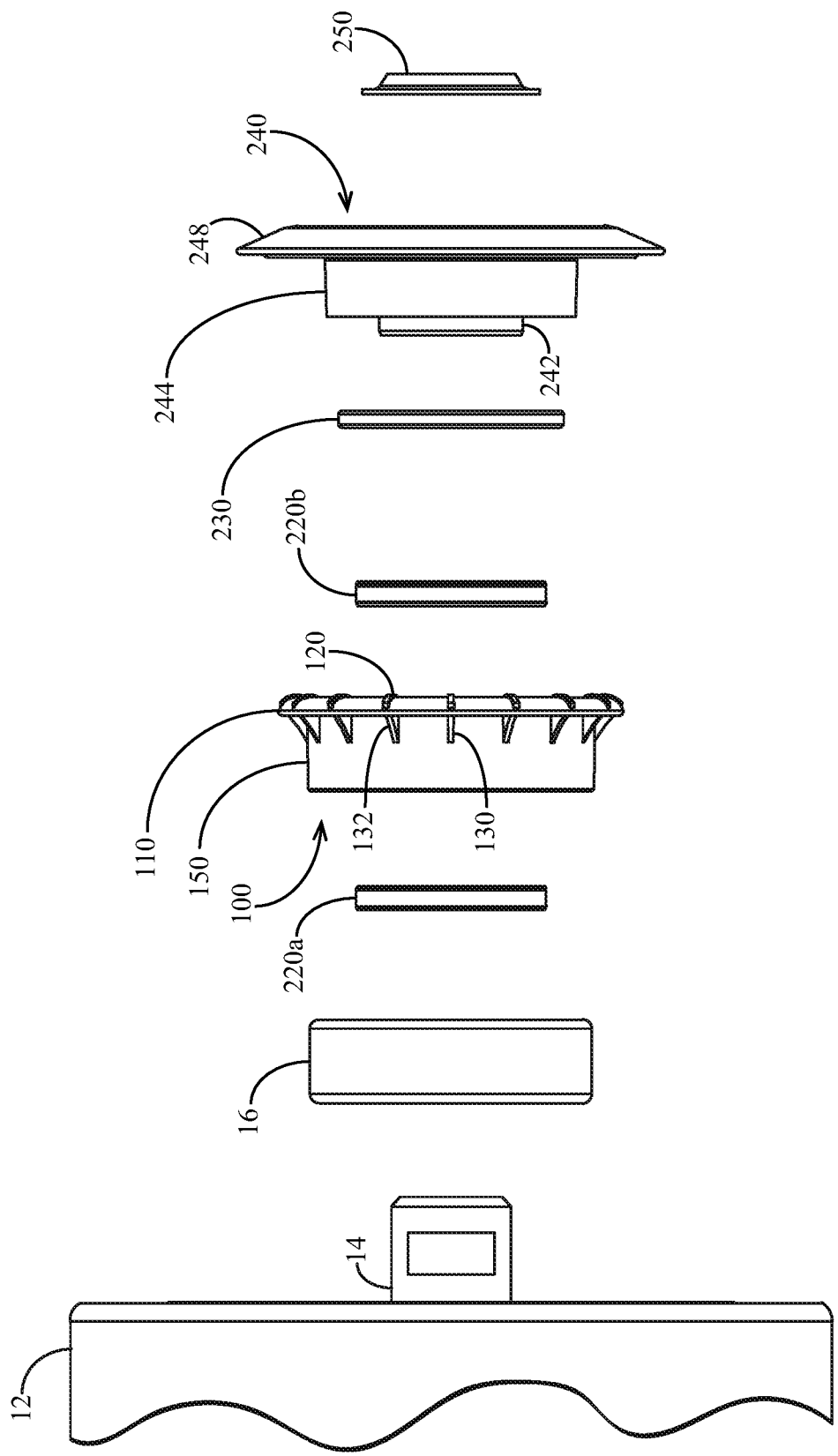
FIG. 3 is an exploded side view of the idler roll of FIG. 1.

Conveyor idler seal apparatus are disclosed. Seal assemblies for conveyor idler rolls are provided. In some embodiments, a plurality of subsets of seal components (e.g., replaceable components) are selectively installable in the seal assembly. In some embodiments, one or more fins are included on a seal (e.g., on a moving seal).

Referring to the drawings, wherein like reference numerals designate identical or corresponding parts throughout the several views, FIGS. 1-7 illustrate an embodiment of an idler roll 10. The idler roll 10 optionally includes a cylinder 12 (which may be referred to as a can or by other terminology) disposed to rotate about a shaft 14. In some embodiments, the cylinder 12 rolls a first bearing 16-1 and a second bearing 16-2 (see FIG. 4) optionally disposed at generally opposite ends of the shaft 14. The bearings 16 optionally comprise ball bearings including a plurality of balls 17 disposed between an inner and outer race, the inner race rollingly contacting the shaft 14. In some embodiments, the idler roll 10 includes a first end disc 60-1 and second end disc 60-2 disposed at generally opposing ends of the cylinder 12. Each end disc 60 is optionally mounted to (e.g., welded, press fit, fastened, formed as a part with) the cylinder 12. Each end disc 60 optionally includes a flat annular region 62. Each end disc 60 optionally includes an opening Ob (e.g., a central axial opening) disposed to receive the shaft 14 therethrough. Each end disc 60 optionally includes a recess R (e.g., a central axial recess) configured to at least partially receive the bearing 16 therein.

A seal assembly 200 is optionally disposed adjacent to each end disc 60. For example, seal assemblies 200-1, 200-2 are optionally disposed adjacent to the end discs 60-1, 60-2. In some embodiments, each seal assembly is optionally disposed between each end disc 60 and each end 15 (e.g., ends 15-1, 15-2) of the shaft 14.

The seal assembly 200 optionally includes an external seal 240 (e.g., a stationary seal). The external seal 240 is optionally made of plastic (e.g., nylon, Delrin, etc.) but may alternatively be made of metal or other material. An opening (e.g., central axial opening) of the external seal 240 is optionally positioned (e.g., press-fit, mounted, locked, etc.) on the shaft 14. The seal assembly 200 optionally includes a seal 100 (e.g., an internal seal). The seal 100 is optionally configured to retain one or more seals as described herein. The seal 100 is optionally made of plastic (e.g., nylon, Delrin, etc.) but may alternatively be made of metal or other material. The external seal 240 and seal 100 may be made of the same material or of two different materials. A retainer 250 (e.g., a retaining ring such as a snap ring, or other suitable device or structure) optionally retains the axial position of the seal assembly 200 and/or the bearing 16 along the shaft 14 (e.g., relative to the end disc 60). An inboard end 144 of the seal 100 optionally contacts (and/or is adjacent to) the bearing 16.

In operation, a conveyor belt (e.g., conveyor belt 5) optionally travels over the roll 10, optionally causing the cylinder 12 and end discs 60 to rotate about the shaft 14 on bearings 16. In operation, the shaft 14 optionally remains stationary (e.g., relative to its associated support structure such as one or more support stands). In operation, the external seal 240 optionally remains stationary while the seal 100 rotates with the cylinder 12 (e.g., as a result of being press-fit into the recess R, locked into a notch or groove, or otherwise constrained to rotate with the end disc 60). The seal 100 is optionally press-fit against an annular portion 66 (e.g., a generally axially extending portion) of the end disc 60.

Figure 7:
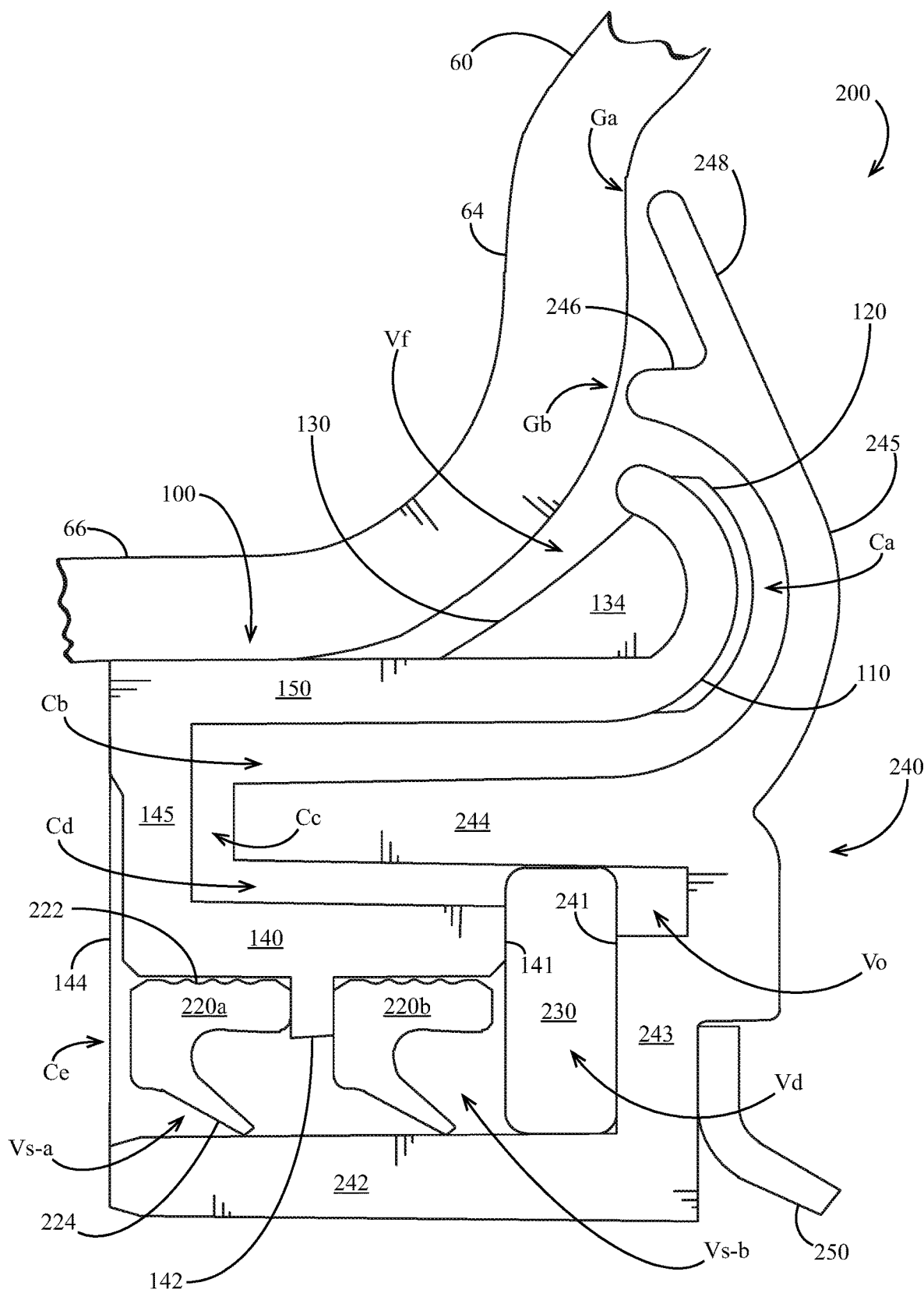
FIG. 7 is an enlarged partial half-section view of the idler roll of FIG. 1.

Referring to FIG. 7, the seal assembly 200 is shown in more detail mounted to the end disc 60. In order to reach the bearing 16 from outside the roll 10, a liquid contaminant (e.g., water, a liquid mixture including water and/or other materials, etc.) optionally enters a gap Ga disposed between a radially outer annular lip 248 and the end disc 60 (e.g., a generally radially extending surface 64 thereof). The liquid contaminant optionally next enters a gap Gb disposed between a radially inner annular lip 246 and the end disc 60 (e.g., the generally radially extending surface 64 thereof).

Figure 4:
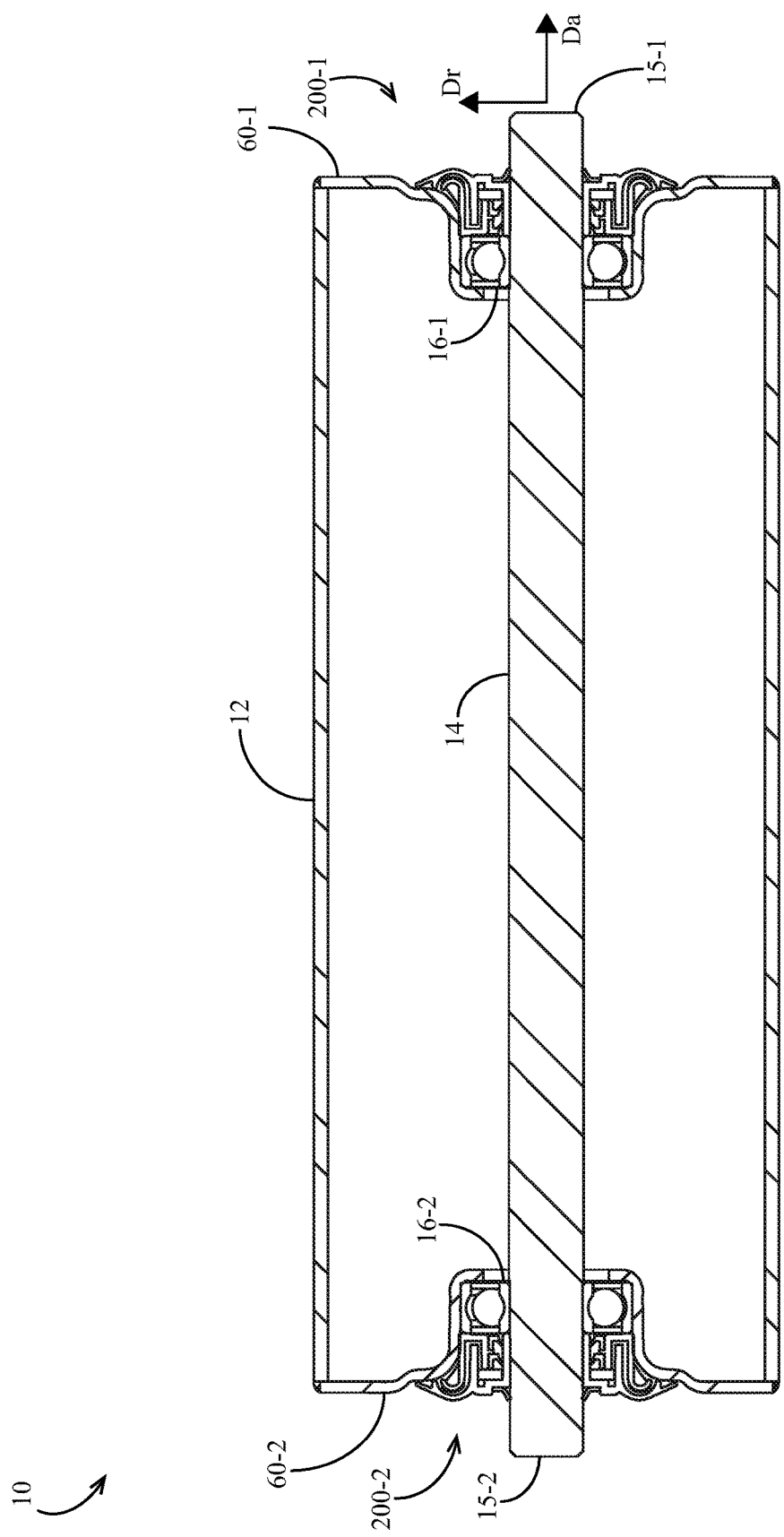
FIG. 4 is a half-section view of the idler roll of FIG. 1.
Figure 5:
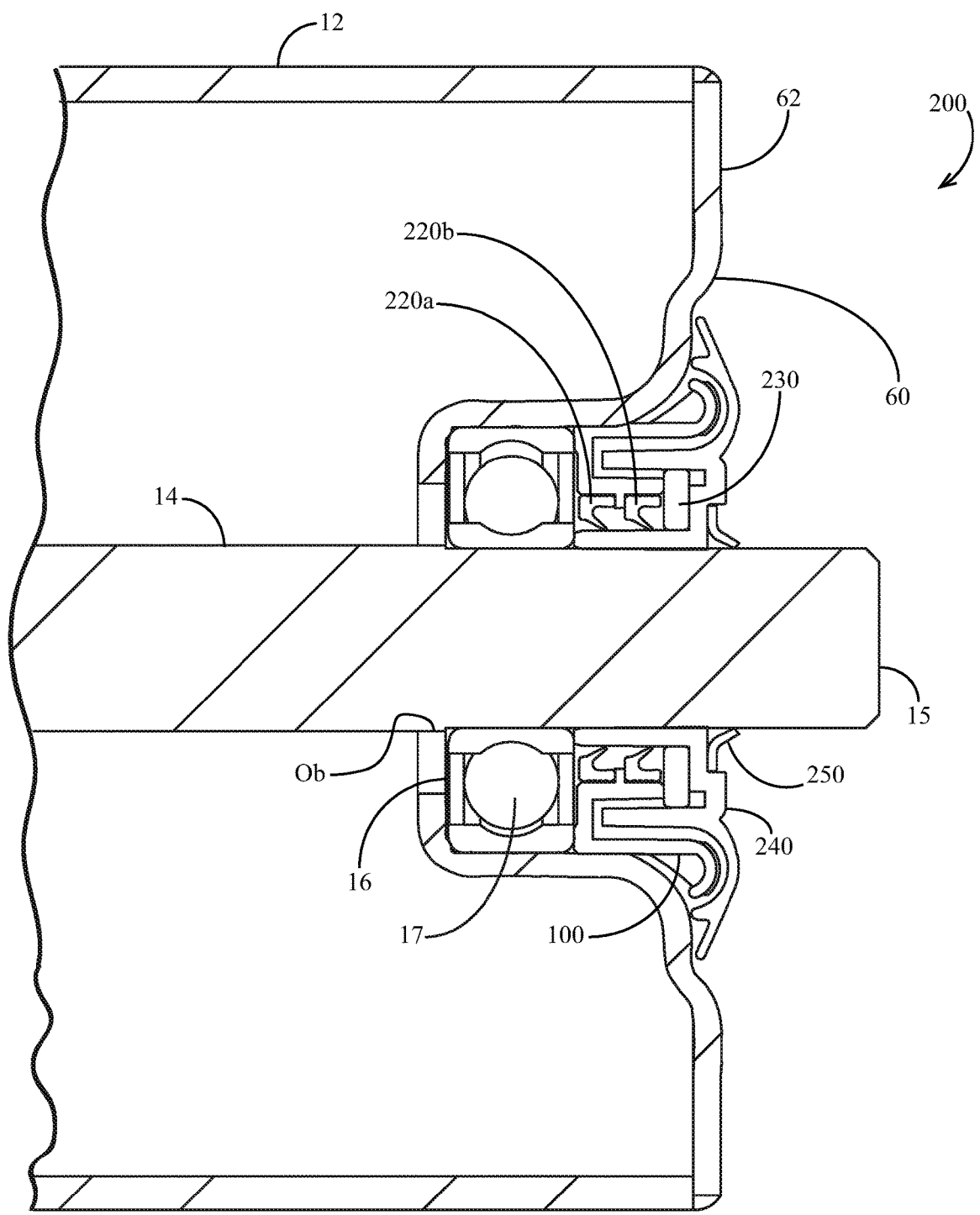
FIG. 5 is an enlarged partial half-section view of the idler roll of FIG. 1.
Figure 6:
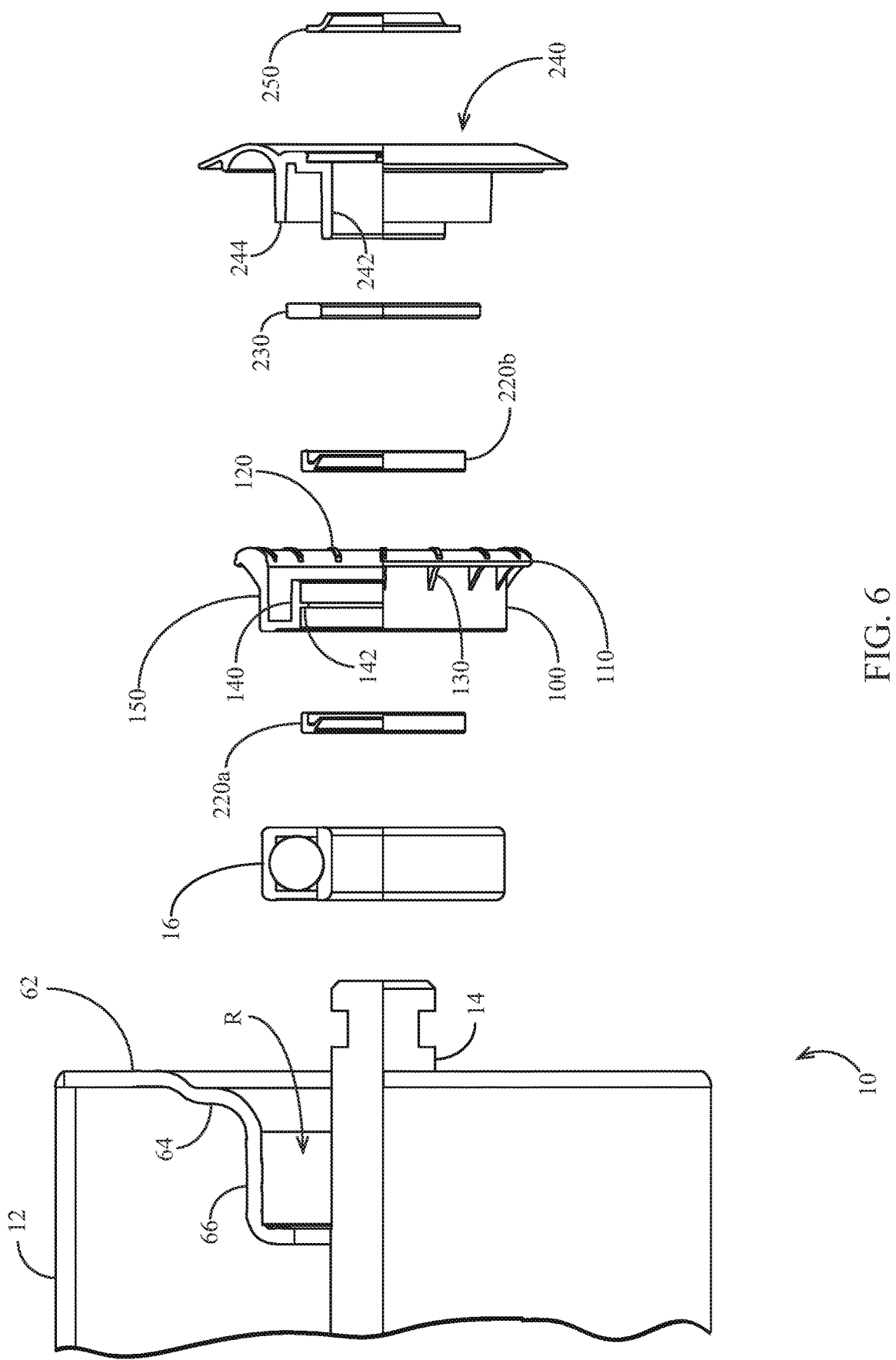
FIG. 6 is a quarter-section view of the idler roll of FIG. 1.

Unless otherwise contextually indicated, the terms "axial" or "axially" may be used herein to refer to a direction (or measurement along a direction) along which the shaft 14 extends (e.g., the direction Da shown in FIG. 4). Unless otherwise contextually indicated, the term "radial" or "radially" may be used herein to refer to a direction (or measurement along a direction) normal to the axial direction (e.g., the direction Dr shown in FIG. 4).

The liquid contaminant optionally next enters a fill volume Vf. The fill volume Vf is optionally partially bounded by an annular lip 110 (e.g., a curved annular lip) of the seal 100. The fill volume Vf is optionally partially bounded by the end disc 60. The fill volume Vf is optionally partially bounded by a radially outer annular wall 150 of the seal 100. Rotation of the seal 100 optionally causes rotation of the liquid contaminant in the fill volume Vf. Rotation of the liquid contaminant in the fill volume Vf optionally creates a centrifugal force which optionally tends to urge the liquid contaminant radially outwardly (e.g., out of gaps Gb and/or Ga).

The seal 100 optionally includes one or more fins 130. In some embodiments, a plurality of fins is circumferentially arranged about the annular wall 150 of the seal 100. Each fin 130 optionally extends into the fill volume Vf. Each fin 130 optionally includes a chamfer surface 132 extending between the annular lip 110 and the annular wall 150. In some embodiments, each fin 130 fills a substantial portion (e.g., over 5%, over 10%, over 20%, over 30%, over 40%, over 50%, over 60%) of a radial slice of the fill volume Vf (e.g., the area in the page as shown in FIG. 7).

In operation, each fin 130 optionally rotates with the seal 100 about the shaft 14 while the end disc 60 optionally remains stationary. The rotational movement of the fin 130 (or plurality of fins) optionally tends to increase the rotational movement of liquid contaminant in the fill volume Vf and thus optionally tends to increase centrifugal force imposed on the liquid contaminant in the fill volume Vf.

In the illustrated embodiment, each fin 130 includes generally radially extending side surfaces 134. In alternative embodiments, one or more side surfaces 134 are angled relative to the radial direction (e.g., backswept relative to the direction of rotation or forward-swept relative to the direction of rotation).

In alternative embodiments, one or more fins extending into the fill volume Vf are mounted to the end disc 60 instead of or alternatively to the fins 130 mounted to the seal 100.

Liquid contaminant optionally enters a channel Ca extending between the annular lip 110 of the seal 100 and an annular lip 245 (e.g., an annular wall, a curved annular wall, etc.) of the external seal 240. In some embodiments, liquid contaminant optionally enters the channel Ca after (e.g., only after) filling the fill volume Vf. The channel Ca optionally comprises a curved annular channel.

Rotation of the seal 100 optionally causes rotation of the liquid contaminant in the channel Ca. Rotation of the liquid contaminant in the channel Ca optionally creates a centrifugal force which optionally tends to urge the liquid contaminant radially outwardly (e.g., out of gaps Gb and/or Ga).

The seal 100 optionally includes one or more fins 120. In some embodiments, a plurality of fins 120 (e.g., 120a, etc.) is circumferentially arranged about the annular lip 110 of the seal 100. Each fin 120 optionally extends into the channel Ca. Each fin 120 is optionally attached to (e.g., formed as a part with) the annular lip 110; in alternative embodiments, one or more fins are alternatively or additionally attached to (e.g., formed as a part with) the inner surface of the lip 245. In some embodiments, each fin 120 fills a substantial portion (e.g., over 5%, over 10%, over 20%, over 30%, over 40%, over 50%, over 60%) of a radial slice of the channel Ca (e.g., the area in the page as shown in FIG. 7).

In operation, each fin 120 optionally rotates with the seal 100 about the shaft 14 while the external seal 240 optionally remains stationary. The rotational movement of the fin 120 (or plurality of fins) optionally tends to increase the rotational movement of liquid contaminant in the channel Ca and thus optionally tends to increase centrifugal force imposed on the liquid contaminant in the fill volume Ca.

In the illustrated embodiment, each fin 120 optionally includes generally radially extending side surfaces. In alternative embodiments, one or more side surfaces of the fin 120 are angled relative to the radial direction (e.g., backswept relative to the direction of rotation or forward-swept relative to the direction of rotation).

Liquid contaminant optionally enters a channel Cb (e.g., a generally axially-extending annular channel). The channel Cb is optionally bounded at a radially outer end by the annular wall 150 of the seal 100. The channel Cb is optionally bounded at a radially inner end by an annular wall 244 of the external seal 240.

Liquid contaminant optionally enters a channel Cc (e.g., a generally radially-extending annular channel). The channel Cc is optionally bounded at an axially inboard end by an annular wall 145 of the seal 100. The channel Cc is optionally bounded at an axially outboard end by an inboard surface of the annular wall 244 of the external seal 240.

Liquid contaminant optionally enters a channel Cd (e.g., a generally axially-extending annular channel). The channel Cd is optionally bounded at a radially outer end by the annular wall 150 of the seal 100. The channel Cb is optionally bounded at a radially inner end by an annular wall 244 of the external seal 240.

Liquid contaminant optionally enters a disc volume Vd (e.g., a generally radially-extending annular volume). The disc volume Vd optionally extends between the annular wall 244 of the external seal 240 and a radially inner annular wall 242 of the external seal 240. In some implementations, a disc 230 (e.g., a felt disc or an annular seal such as a rubber seal) may be disposed in the disc volume. Liquid contaminant exiting the channel Cd optionally flows through the disc volume Vd (e.g., through the disc 230). The disc 230 is optionally retained in position by the seals 100, 240 (e.g., by an outboard surface 141 of the annular wall 140, by an inboard surface 241 of an annular wall 243 of the seal 240, by the wall 244, and/or by the wall 242). In some embodiments, the seals 100, 240 optionally compress at least a portion of the disc 230. In other embodiments, the disc 230 is not compressed by the seals 100, 240.

In some embodiments, an overflow volume Vo (e.g., an annular volume) is optionally disposed outboard of the disc 230. A portion of the liquid contaminant optionally enters the overflow volume after passing through the disc volume Vd (e.g., through the disc 230).

All or a portion of liquid contaminant passing through the disc volume Vd (e.g., through the disc 230) optionally enters a channel Ce (e.g., a generally axially-extending annular channel). The channel Ce is optionally bounded at a radially outer end by wall 140 and at a radially inner end by wall 242.

The channel Ce optionally includes one or more seal volumes Vs configured to optionally receive seals 220. The seals 220 may comprise annular seals (e.g., oil seals, o-rings, etc.). In an exemplary embodiment described for illustrative purposes only, one or both of the seals 220 comprise a TRK radial oil seal available from Trelleborg Group in Trelleborg, Sweden. Each seal 220 optionally comprises a ridged surface configured to frictionally engage the wall 140 of the seal 100. The seals 220 optionally rotate with the seal 100. Each seal optionally comprises a resilient inner ring 224 configured to slidingly engage the wall 242. Each seal optionally comprises a resilient outer ring which engages the wall 140.

In some embodiments, a first seal volume Vs-a optionally contains a seal 220a and a second seal volume Vs-b optionally contains a seal 220b. In such embodiments, liquid contaminant optionally passes sequentially past the seal 220b and then the seal 220a.

In some embodiments, a protrusion 142 (e.g., an annular protrusion) extends at least partially between the first and second seal volumes Vs-a, Vs-b. In the illustrated embodiment, the protrusion 142 is attached to (e.g., formed as a part with) the wall 140. In alternative embodiments, the protrusion 142 comprises a removable object (e.g., an annular object such as an o-ring). In alternative embodiments, a protrusion is attached to (e.g., formed as a part with) the wall 242 alternatively or additionally to the protrusion 142.

The seal assembly 200 optionally permits a user to selectively install all or a subset of a group of sealing components (e.g., the group comprising the seals 220a, 220b and the disc 230). The group of sealing components may include replaceable sealing components and/or flexible sealing components. In a first example (as illustrated in FIG. 7), the user may install both seals 220a, 220b on the seal 100 as well as installing the disc 230 between the seal 100 and the external seal 240. In a second example, the user may install a first subset of sealing components comprising the seals 220a, 220b and optionally not including the disc 230. In a third example, the user may install a second subset of sealing components comprising the seal 220a and disc 230 and optionally not including the seal 220b. In a fourth example, the user may install a third subset of sealing components comprising the seal 220b and disc 230 and optionally not including the seal 220a. In a fifth example, the user may install a fourth subset of sealing components comprising the disc 230 and optionally not including the seals 220a, 220b. In a sixth example, the user may install a fifth subset of sealing components comprising only one of the seals 220a and 220b and optionally not including the disc 230. In a seventh example, the user may install a sixth subset of sealing components comprising the disc 230 and optionally not including either of the seals 220a, 220b.

In some embodiments, the seal assembly 200 retains each component in the subset of installed sealing components in the installed position without sealing components that are not in the subset of installed sealing components. For example, the wall 140 and/or protrusion 142 optionally tend to retain one of the seals 220a, 220b in its axial position regardless of whether the other seal 220a, 220b and/or the disc 230 are installed. Likewise, the surfaces 141, 241 optionally tend to retain the disc 230 in its axial position regardless of whether one, both or neither of the seals 220a, 220b are installed.

Figure 8:
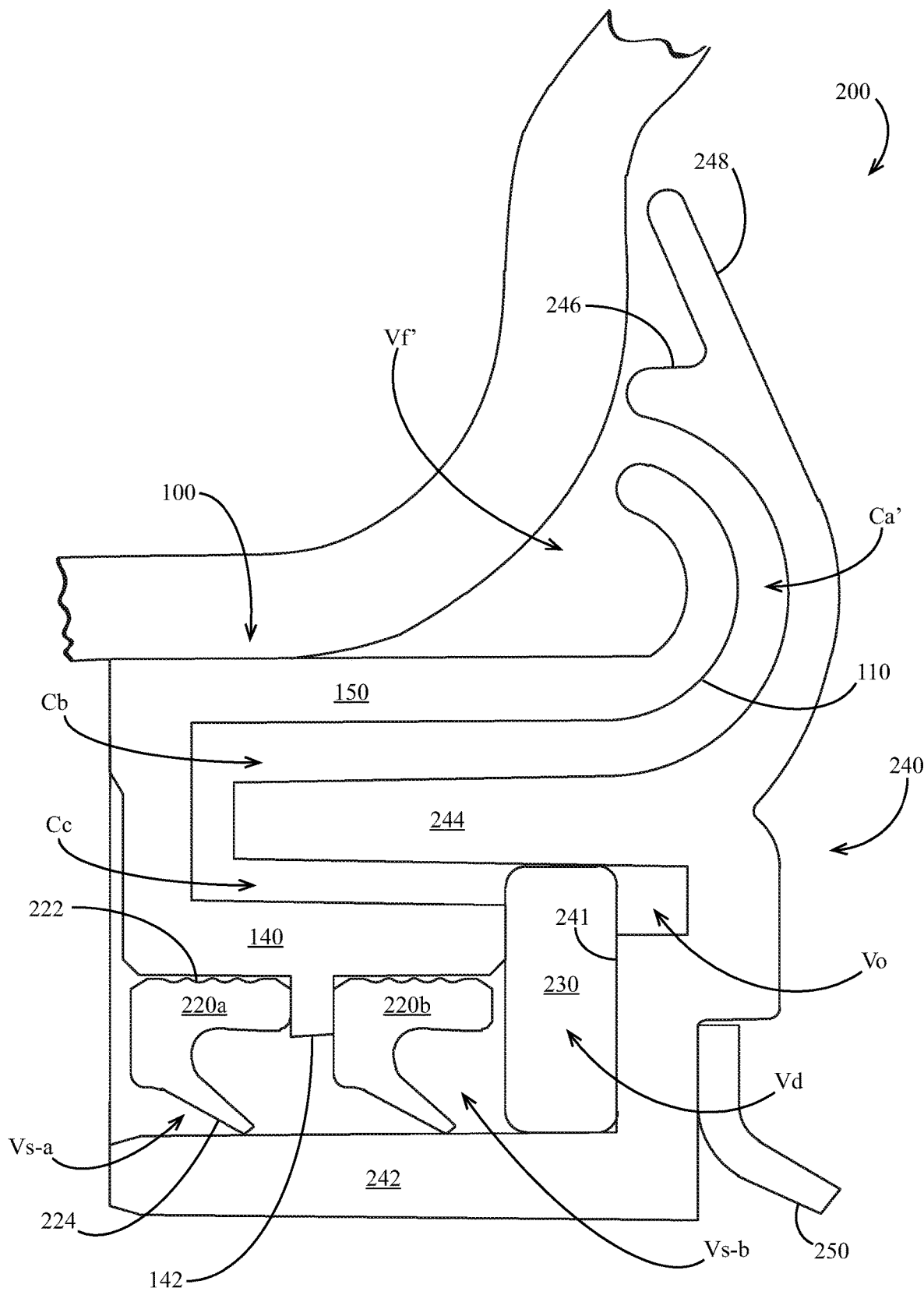
FIG. 8 is an enlarged partial half-section view of another embodiment of an idler roll.

In an alternative embodiment illustrated in FIG. 8, the seal 100 optionally does not include fins 130, optionally resulting in a modified fill volume Vf'. In the embodiment of FIG. 8, the seal 100 also optionally does not include fins 120, optionally resulting in a modified channel Ca'.

Figure 9:
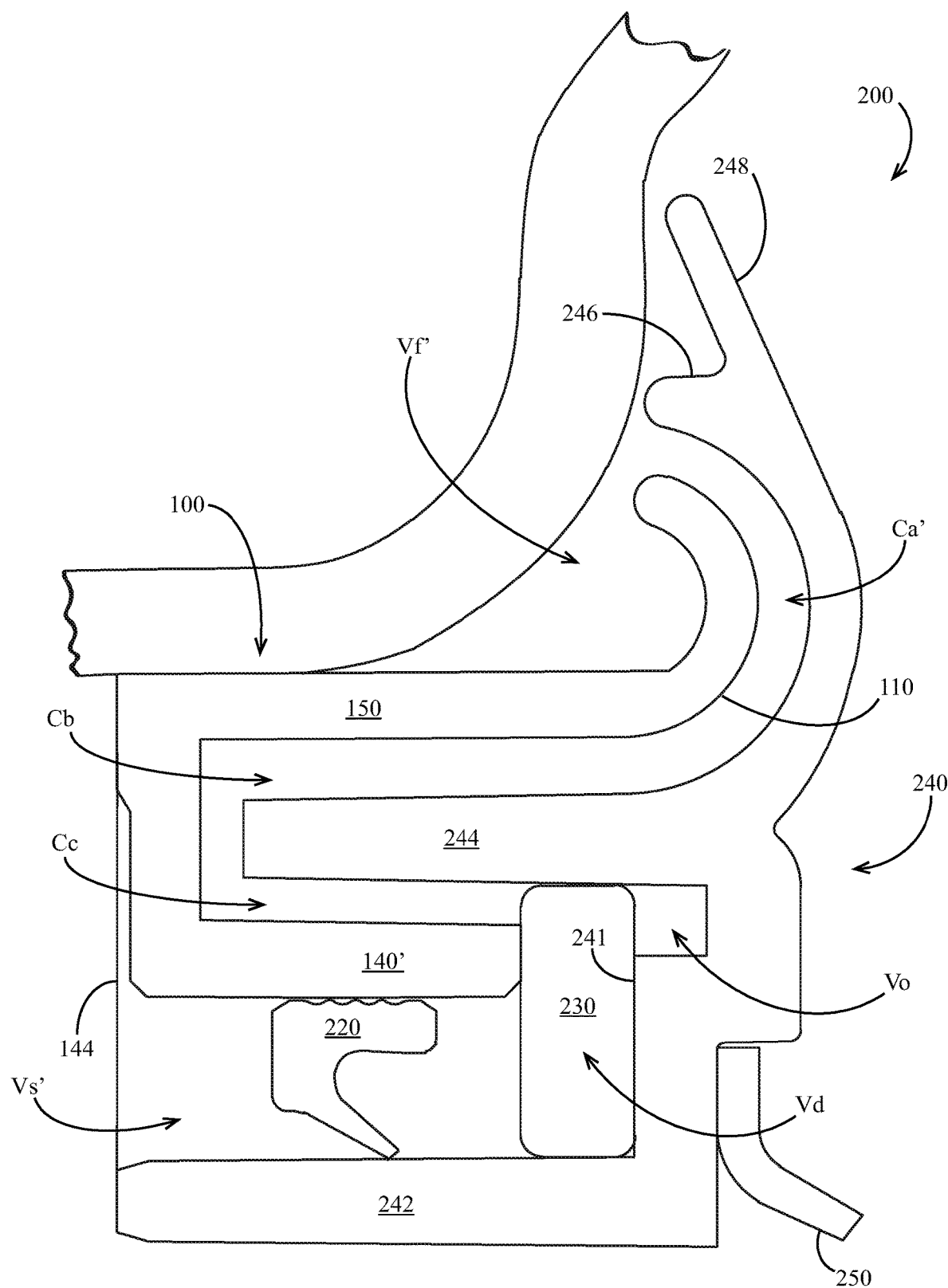
FIG. 9 is an enlarged partial half-section view of another embodiment of an idler roll.

The alternative embodiment illustrated in FIG. 9 is generally similar to the embodiment of FIG. 8 in that the fins 120, 130 are omitted. Additionally, in the embodiment of FIG. 9, a modified wall 140' optionally does not include a protrusion 142, which optionally results in a modified seal volume Vs'. One or more seals 220 may be installed in the modified seal volume Vs'.

Figure 10:
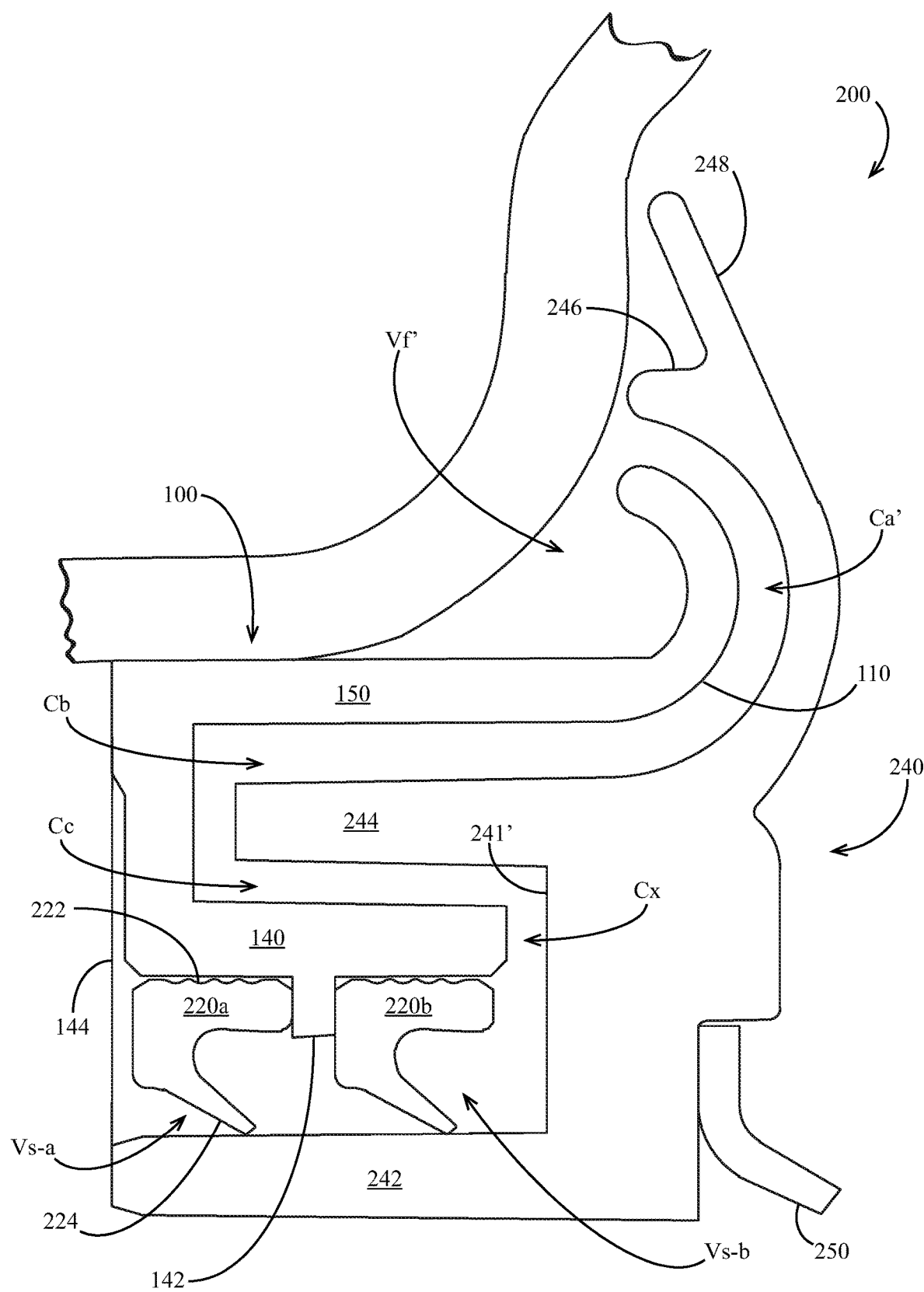
FIG. 10 is an enlarged partial half-section view of another embodiment of an idler roll.

The alternative embodiment illustrated in FIG. 10 is generally similar to the embodiment of FIG. 8 in that the fins 120, 130 are omitted. Additionally, in the embodiment of FIG. 10, a modified surface 241' forms a channel Cx instead of the disc volume Vd.

Figure 11:
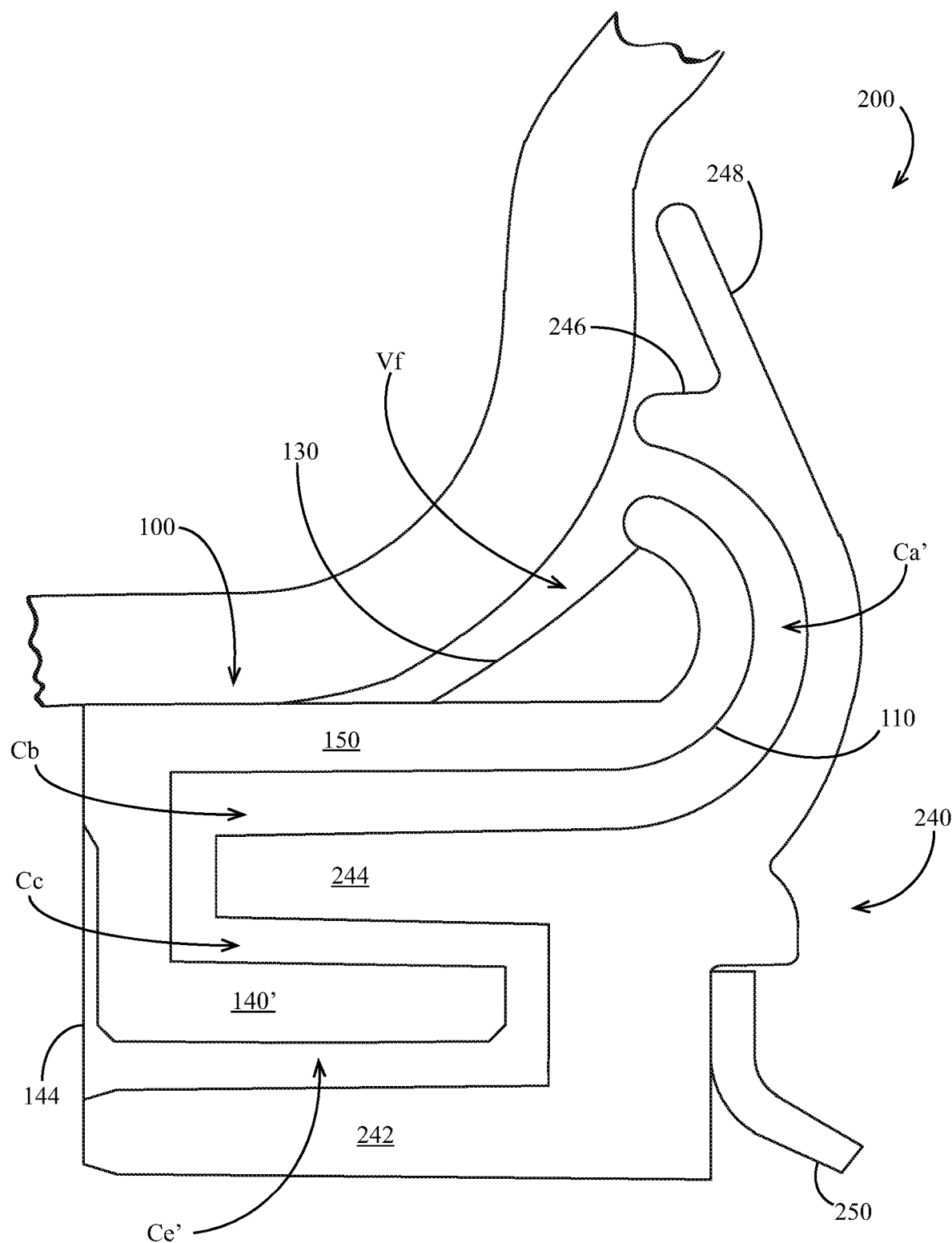
FIG. 11 is an enlarged partial half-section view of another embodiment of an idler roll.

In an alternative embodiment illustrated in FIG. 11, a modified wall 140' optionally does not include a protrusion 142 and the modified channel Ce' optionally has a smaller radial height than the channel Ce. A seal 220 is optionally not installed in the modified channel Ce' in the embodiment of FIG. 11. The embodiment illustrated in FIG. 11 optionally includes the fins 130.

Figure 12:
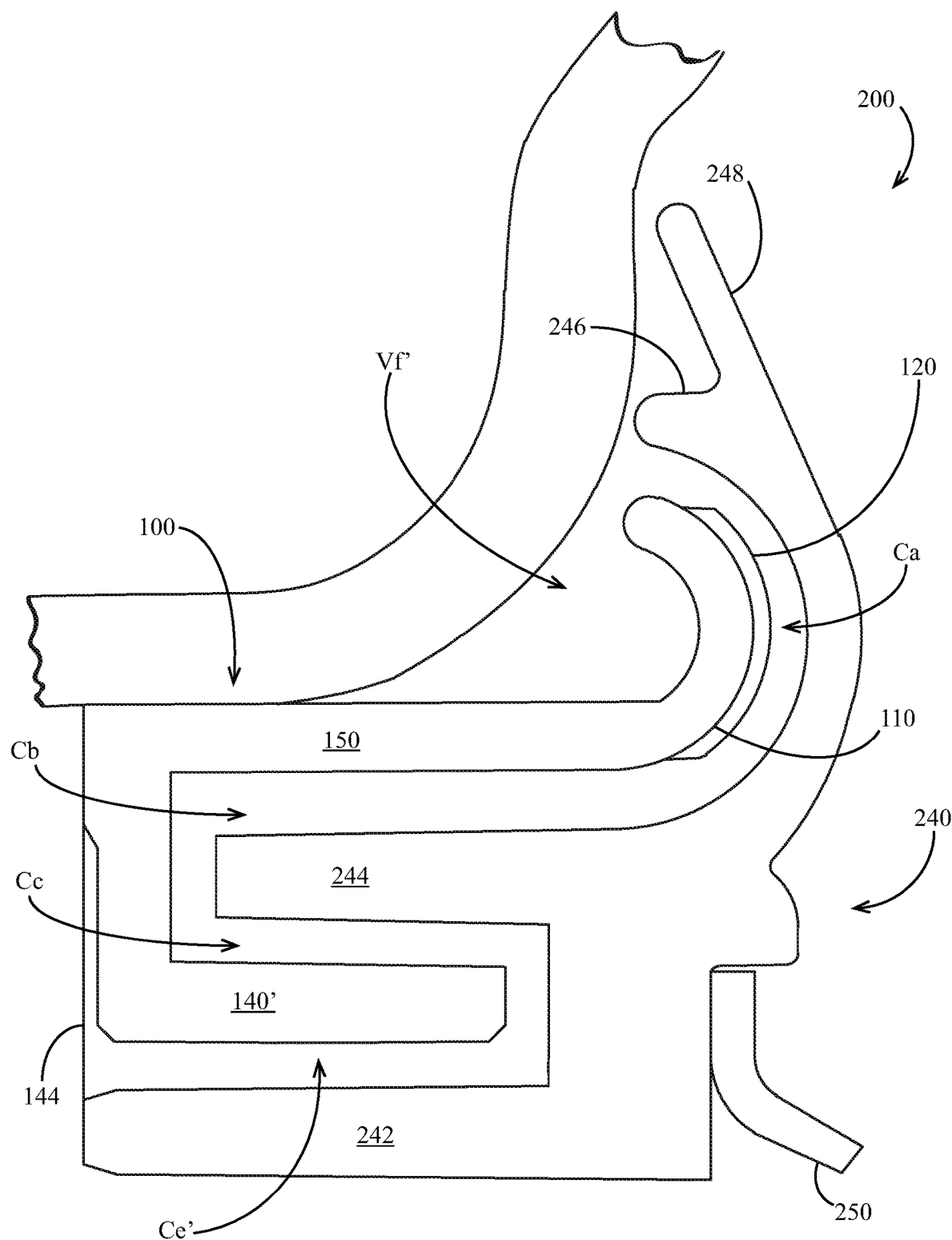
FIG. 12 is an enlarged partial half-section view of another embodiment of an idler roll.

The alternative embodiment illustrated in FIG. 12 is generally similar to the embodiment of FIG. 11. In the embodiment of FIG. 12, the fins 120 are optionally included. In the embodiment of FIG. 12, the fins 130 are optionally omitted.

Figure 14:
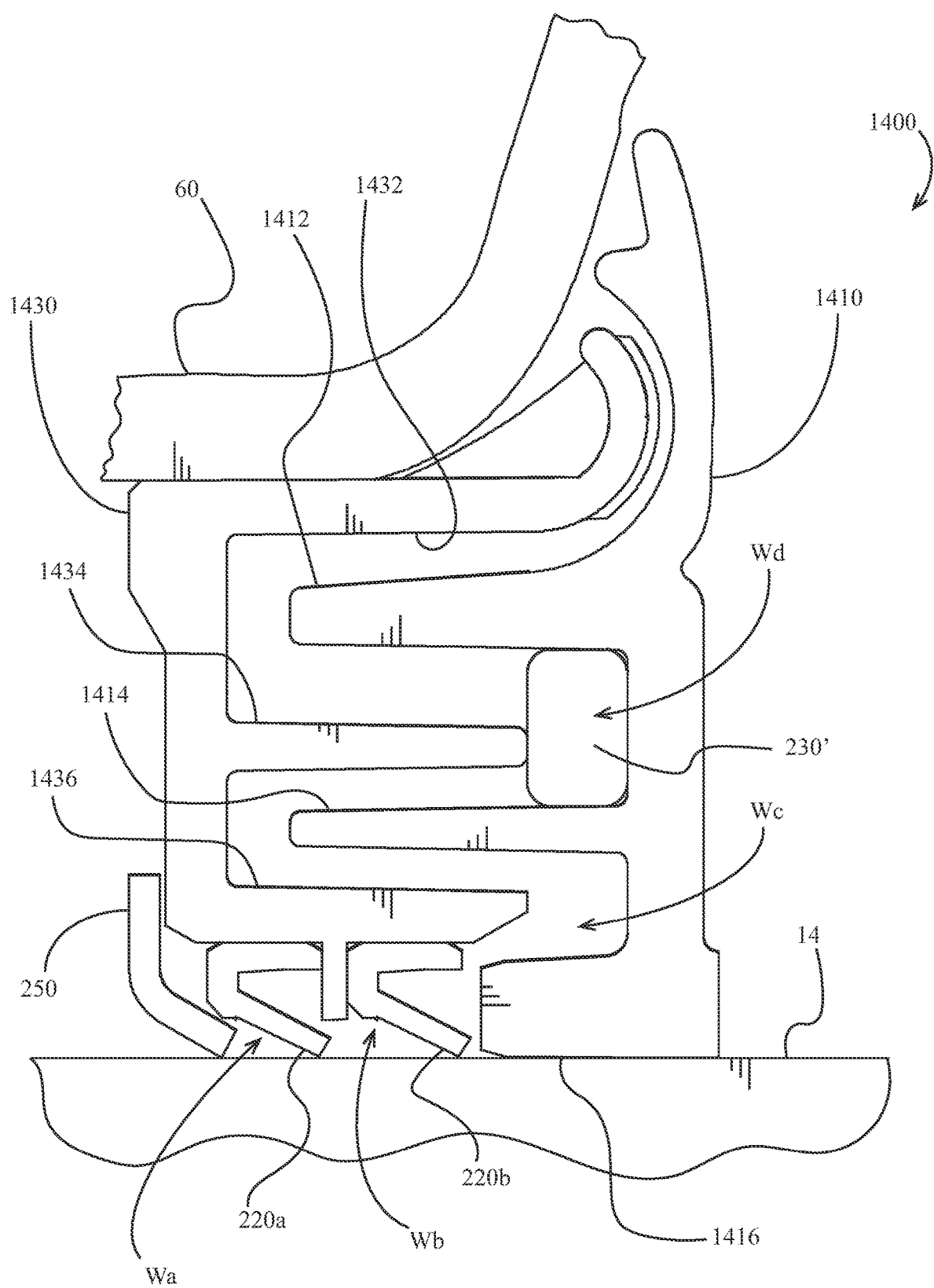
FIG. 14 is an enlarged partial half-section view of another embodiment of an idler roll.

Another embodiment of a seal assembly 1400 is illustrated in FIG. 14. The seal assembly 1400 includes an external seal 1410 and an internal seal 1430. The external seal 1410 is optionally stationary relative to the shaft 14. For example, an inner annular surface 1416 of the external seal 1410 is optionally mounted to (e.g., press-fit onto) the shaft 14. The internal seal 1430 is optionally mounted to (e.g., press-fit into) the end disc 60. Thus in some embodiments the internal seal 1430 rotates relative to the external seal 1410.

Continuing to refer to FIG. 14, the internal seal 1430 optionally includes an annular external wall 1432 which is optionally press-fit into the end disc 60. The internal seal 1430 optionally includes an annular wall 1434 disposed radially inward of the annular external wall 1432. The internal seal 1430 optionally includes an annular wall 1436 disposed radially inward of the annular wall 1434.

Continuing to refer to FIG. 14, the external seal 1410 optionally includes an annular wall 1412 which optionally extends axially at least partially between wall 1432 and wall 1434. The external seal 1410 optionally includes an annular wall 1414 which optionally extends axially at least partially between wall 1434 and wall 1436. The wall 1416 is optionally disposed at least partially radially inward of the wall 1436.

Continuing to refer to FIG. 14, the wall 1436 optionally cooperates with the shaft 14 to at least partially define one or more annular voids Wa, Wb. The voids Wa, Wb are optionally configured to selectively receive one or more sealing elements 220a, 220b, respectively therein.

Continuing to refer to FIG. 14, the walls 1412, 1434, and 1414 optionally cooperate to define an annular void Wd. The void Wd is optionally configured to receive a sealing element 230' (e.g., a disc which may be made of felt or other material, or in other embodiments a rubber seal). For example, in some embodiments, the void Wd optionally includes an upper and lower surface which are substantially parallel. In some embodiments, the void Wd optionally includes an outboard surface which is substantially normal to the parallel upper and lower surfaces of the void Wd. In some embodiments, an annular void Wc is optionally at least partially defined between the walls 1414, 1436, 1416. In some embodiments, a sealing element is optionally selectively installable in the annular void Wc.

Continuing to refer to FIG. 14, a retaining ring 250 is optionally supported on the shaft 14. The retaining ring 250 is optionally disposed axially between the internal seal 1430 and the bearing. In other embodiments, the retaining ring 250 is disposed outboard of the external seal 1410.

Figure 13:
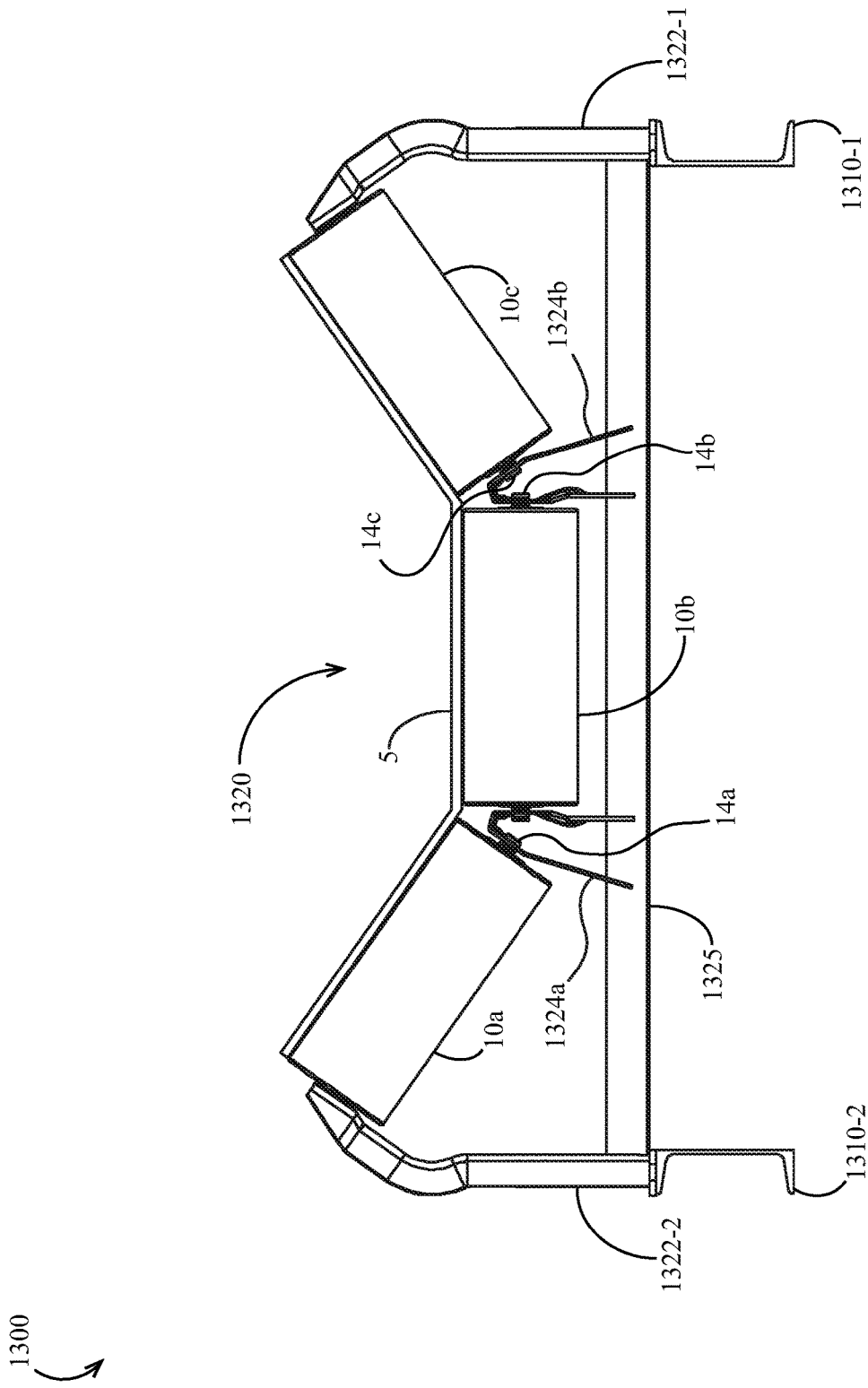
FIG. 13 is a front elevation view of an exemplary idler roll assembly.

One or more rolls incorporating the seal and seal assembly embodiments described herein may be incorporated in a conveyor. In an exemplary implementation provided for illustrative purposes only, the rolls may be included in a conveyor 1300 illustrated in FIG. 13. The conveyor 1300 optionally includes a plurality of idler assemblies 1320 (e.g., equal troughing idlers as illustrated, impact idlers, offset center roll idlers, channel mount low profile idlers, feeder/picking idlers, unequal troughing idlers, garland idlers, return belt idlers, return idlers, return rolls, self-aligning idlers, self-aligning return idlers, flat carrier idlers, rubber cushion flat carrier idlers, live shaft rollers, variable pitch idlers, V-return idlers, or wire rope idlers, among others), some or all of which optionally incorporate the seal and/or seal assemblies described herein. In the illustrated embodiment, the shaft 14 (e.g., 14a, 14b, 14c) of each roll 10 (e.g., 10a, 10b, 10c) is optionally supported by an end stand 1322 (e.g., 1322-1, 1322-2) and/or by a center stand 1324 (e.g., 1324a, 1324b). The end stands and center stands are optionally supported by a base 1325. Each idler assembly 1320 is optionally supported by one or more supports 1310 (e.g., 1310-1, 1310-2) which optionally extend along the length of the conveyor. The conveyor belt 5 optionally contacts the idler assembly 1320 such that the rolls 10 optionally rotate as the conveyor belt 5 moves (e.g., into the page or out of the page in FIG. 13). The conveyor belt 5 may be driven for conveyance by a component such as a driven head pulley (not shown). In various embodiments, the conveyor incorporating the seals and/or seal assemblies described herein may share features or functionality with the conveyor embodiments disclosed in U.S. Pat. Nos. 9,156,617; 5,515,961; and 6,349,819, each of which is incorporated by reference herein in its entirety.

Any ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A seal assembly for use with an idler roll having an end disc, a bearing, and an idler shaft extending in a generally axial direction, the seal assembly comprising:
   an internal seal, said internal seal comprising:
      a first annular internal seal wall; and
      a second annular internal seal wall, said second annular internal seal wall having an internal seal wall annular inner surface and an annular outboard surface;
   an external seal, said external seal comprising:
      a first annular external seal wall, said first annular external seal wall having an external seal wall annular inner surface; and
      a second annular external seal wall, said second annular external seal wall having an inboard surface,
   wherein an inboard portion of said internal seal wall annular inner surface at least partially defines a first annular sealing element volume, said first annular sealing element volume being configured to selectively receive a first annular sealing element therein,
   wherein an outboard portion of said internal seal wall annular inner surface at least partially defines a second annular sealing element volume, said second annular sealing element volume being configured to selectively receive a second annular sealing element therein,
   wherein said annular outboard surface of said second annular internal seal wall, said inboard surface of said second annular external seal wall, and said external seal wall annular inner surface cooperate to at least partially define a third annular sealing element volume, said third annular sealing element volume being configured to selectively receive a third annular sealing element therein.

2. The seal assembly of claim 1, further comprising:
   an annular protrusion disposed axially between said inboard portion of said internal seal wall annular inner surface and said outboard portion of said internal seal wall annular inner surface.

3. The seal assembly of claim 1, wherein said first and second annular sealing elements comprise rubber seals.

4. The seal assembly of claim 2, wherein said third annular sealing element comprises a felt disc.

5. The seal assembly of claim 1, wherein said third annular sealing element comprises a felt disc.

6. The seal assembly of claim 1, wherein said first and second annular sealing element volumes are at least partially defined by the idler shaft.

7. The seal assembly of claim 1, wherein said third annular sealing element volume is at least partially defined by the idler shaft.

8. The seal assembly of claim 1, further comprising:
   a third annular external seal wall, said third annular external seal wall extending generally in the axial direction, said first annular external seal wall having an external seal wall outer surface,
   wherein said first and second annular sealing element volumes are at least partially defined by said external seal wall outer surface.

9. The seal assembly of claim 1, wherein said internal seal further comprises an internal seal annular lip, said internal seal annular lip at least partially defining a fill volume, said fill volume being disposed at least partially between said internal seal annular lip and the end disc, and wherein said external seal further comprises an external seal annular lip, said external seal annular lip and said internal seal annular lip cooperating to at least partially define an annular channel therebetween.

10. The seal assembly of claim 9, further comprising:
    a first plurality of fins arranged circumferentially on said internal seal, each of said first plurality of fins extending into said fill volume.

11. The seal assembly of claim 10, further comprising:
    a second plurality of fins arranged circumferentially on said internal seal, each of said second plurality of fins extending into said annular channel.

12. The seal assembly of claim 10, further comprising:
    a first plurality of fins arranged circumferentially on said internal seal, each of said first plurality of fins extending into said fill volume.

13. A seal assembly for use with an idler roll supported on an idler shaft extending along an axial direction, the seal assembly comprising:
    an internal seal;
    an external seal, said external seal cooperating with said internal seal to form a labyrinthine flow path, wherein at least one of said internal seal and said external seal at least partially define each of a first annular sealing element volume, a second annular sealing element volume, and a third annular sealing element volume, wherein said first, second, and third annular sealing element volumes are disposed along said labyrinthine flow path;
    a first annular sealing element selectively installable in said first annular sealing element volume;
    a second annular sealing element selectively installable in said second annular sealing element volume; and
    a third annular sealing element selectively installable in said third annular sealing element volume, whereby the seal assembly has a first plurality of configurations in which only one of said first, second and third annular sealing elements are installed, whereby the seal assembly has a second plurality of configurations in which only two of said first, second and third annular sealing elements are installed, whereby the seal assembly has a fully installed configuration in which said first, second and third annular sealing elements are installed.

14. The seal assembly of claim 13, further comprising:
an annular protrusion supported on one of said external seal and said internal seal.

15. The seal assembly of claim 13, wherein said first and second annular sealing elements comprise rubber seals.

16. The seal assembly of claim 15, wherein said third annular sealing element comprises a felt disc.

17. The seal assembly of claim 13, wherein said third annular sealing element comprises a felt disc.

18. The seal assembly of claim 13, wherein said internal seal further comprises an internal seal annular lip, said internal seal annular lip at least partially defining a fill volume, and wherein said external seal further comprises an external seal annular lip, said external seal annular lip and said internal seal annular lip cooperating to at least partially define an annular channel therebetween.

19. The seal assembly of claim 18, further comprising:
a first plurality of fins arranged circumferentially on said internal seal, each of said first plurality of fins extending into said fill volume.

20. The seal assembly of claim 18, further comprising:
a second plurality of fins arranged circumferentially on one of said internal seal and said external seal, each of said second plurality of fins extending into said annular channel.

21. A method of assembling a seal assembly in one of a plurality of configurations for use with an idler roll supported on an idler shaft, the method comprising:

installing an internal seal, said internal seal at least partially defining one or more of a first, second, and third annular sealing element volumes;

forming a flow path by installing an external seal, said external seal at least partially defining one or more of a-said first, second, and third annular sealing element volumes, wherein said first, second, and third annular sealing element volumes are disposed along said flow path;

selecting and installing a subset of a set of annular sealing elements along said flow path, the set comprising at least one of a first, second and third annular sealing element, said subset comprising any one, two, or three of said set of annular sealing elements.

22. The method of claim 21, wherein said first and second annular sealing elements comprise rubber seals.

23. The method of claim 22, wherein said third annular sealing element comprises a felt disc.

24. The method of claim 21, wherein said third annular sealing element comprises a felt disc.

25. The method of claim 21, wherein said internal seal further comprises an internal seal annular lip, said internal seal annular lip at least partially defining a fill volume, and wherein said external seal further comprises an external seal annular lip, said external seal annular lip and said internal seal annular lip cooperating to at least partially define an annular channel therebetween.

26. The method of claim 25, further comprising:
rotating a plurality of fins on said internal seal relative to said external seal.

27. The method of claim 26, wherein said plurality of fins are attached to said internal seal annular lip.

28. The method of claim 26, wherein said plurality of fins are disposed adjacent to said external seal.

* * * * *

UNITED STATES PATENT AND TRADEMARK OFFICE
CERTIFICATE OF CORRECTION

PATENT NO. : 10,865,048 B2
APPLICATION NO. : 16/799311
DATED : December 15, 2020
INVENTOR(S) : Lafe Grimm, Paul Schmidgall and Owen Greg Rude Page 1 of 1

It is certified that error appears in the above-identified patent and that said Letters Patent is hereby corrected as shown below:

In the Claims

Claim 21, Column 10, Lines 5 and 6, after "of" and before "said" delete "a-".

Signed and Sealed this
Ninth Day of March, 2021

Drew Hirshfeld
*Performing the Functions and Duties of the
Under Secretary of Commerce for Intellectual Property and
Director of the United States Patent and Trademark Office*